United States Patent [19]

Matsumoto

[11] Patent Number: 5,107,334
[45] Date of Patent: Apr. 21, 1992

[54] PICTURE IMAGE ZOOMING WITH BRIGHTNESS ENHANCEMENT OF INSET IMAGE

[75] Inventor: Hajime Matsumoto, Yokohama, Japan

[73] Assignee: Matsushita Electric Industrial Co., Ltd., Osaka, Japan

[21] Appl. No.: 571,233

[22] Filed: Aug. 23, 1990

[30] Foreign Application Priority Data

Aug. 28, 1989 [JP] Japan ................... 1-220717

[51] Int. Cl.$^5$ .................... H04N 5/45; H04N 5/57
[52] U.S. Cl. .................... 358/180; 358/209
[58] Field of Search ............ 358/108, 180, 451, 160, 358/113, 209

[56] References Cited

U.S. PATENT DOCUMENTS 4,963,981  10/1990  Todaka et al. ............... 358/180 X
4,991,020  2/1991  Zwirn ........................ 358/180 X

FOREIGN PATENT DOCUMENTS 91868  10/1983  European Pat. Off. .......... 358/169

*Primary Examiner*—James J. Groody
*Assistant Examiner*—Mark R. Powell
*Attorney, Agent, or Firm*—Stevens, Davis, Miller & Mosher

[57] ABSTRACT

A picture image zoom apparatus is provided which includes an area specifying unit which designates a predetermined area of the displayed picture image for magnification. The specified area is displayed on the display unit (which displays the overall video signal from the camera circuit) in a manner so as to be distinguishable from the other areas of the picture image. The video signal is produced from the camera circuit and written in a picture image memory. As a result, the video signal is sequentially read from the image memory, and the portion of the video signal corresponding to the predetermined area of the image is displayed on the display unit in a magnified form.

4 Claims, 2 Drawing Sheets

F I G. 2
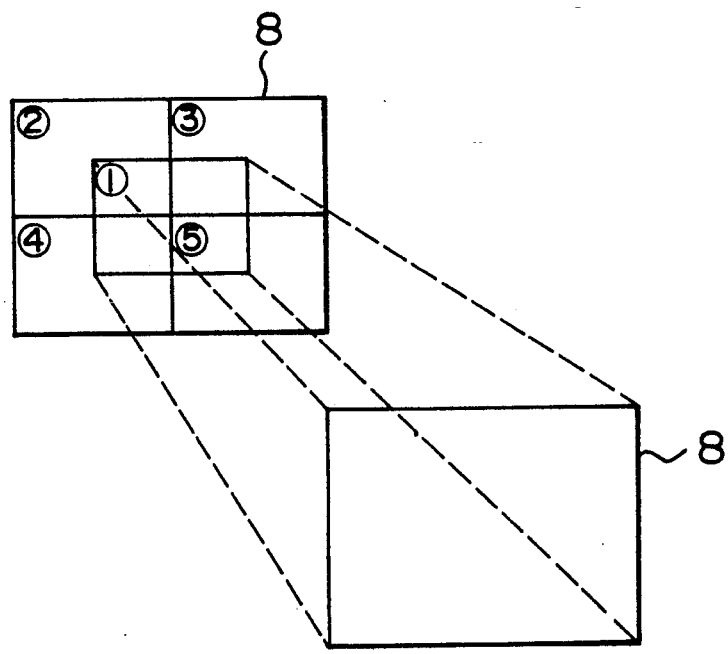
F I G. 3A
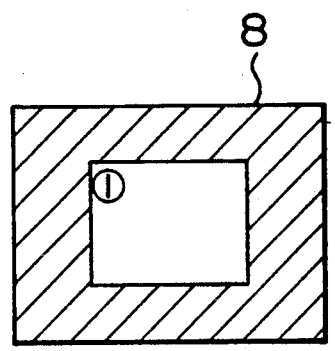
F I G. 3B
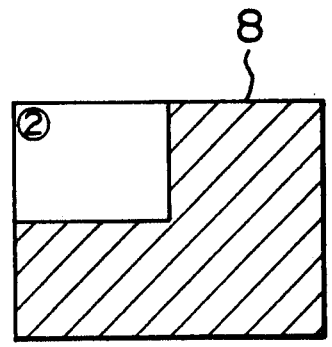

PICTURE IMAGE ZOOMING WITH BRIGHTNESS ENHANCEMENT OF INSET IMAGE

BACKGROUND OF THE INVENTION

This invention relates to a picture image zooming apparatus used for CCTV systems, in which a video signal from a video camera is partially magnified for display.

The picture image zooming apparatus of this type has so far been used for magnifying and displaying a predetermined area of a picture image displayed on a television monitor.

SUMMARY OF THE INVENTION

A conventional picture image zooming apparatus, however, cannot select a desired area of the picture image which is to be magnified and is displayed on the television monitor.

This invention is provided to solve the conventional problem as mentioned above. It is an object of the invention to provide a picture image zooming apparatus which is capable of selecting a desired area of the picture image which is to be magnified and is displayed on the television monitor and which is capable of displaying the selected zoomed area which is to be distinguishable from the other areas of the picture image.

In this invention, to achieve the above object, there is provided a picture image zooming apparatus comprising a display unit for displaying a video signal produced from a camera, an area specifying unit for specifying a predetermined area of the picture image displayed on the display unit, a zoom area displaying unit for enabling the area of the picture image which is specified by the area specifying unit and displayed on the display unit, to be displayed distinguishably from the other areas of the picture image, and a zooming unit for sequentially reading the video signal from a picture image memory in which the video signal from the camera is stored and for causing the read video signal to be magnified and displayed on the display unit.

Thus, according to the apparatus of this invention, when a given area of the picture image which is to be magnified and is displayed on the display unit is specified by the area specifying unit, a zoom area displaying signal is produced from the zoom area displaying unit, so that the specified area is displayed distinguishably from the other areas of the picture image, thus resulting in the zoomed area being clearly observed.

BRIEF DESCRIPTION OF THE DRAWINGS

FIG. 2 shows that a specified area of the picture image is magnfied in the apparatus of FIG. 1; and FIGS. 3A and 3B show that the specified areas of the picture image is provided with an increased brightness level.

DESCRIPTION OF THE PREFERRED EMBODIMENT

Figure 1:
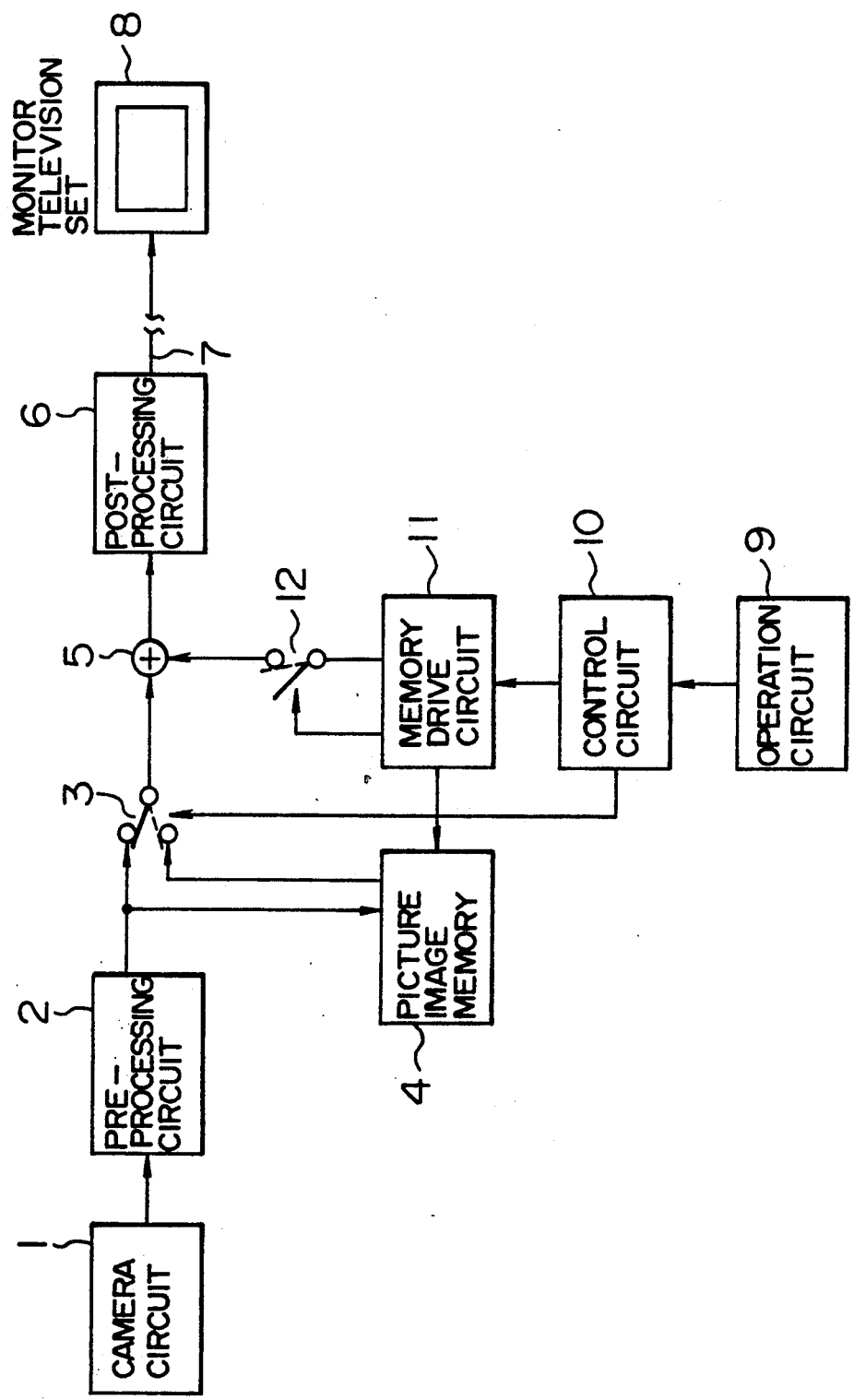
FIG. 1 is a block diagram of one embodiment of a picture image zooming apparatus of this invention.

One embodiment of this invention will be described with reference with the drawings.

Referring to FIG. 1, there are shown a camera circuit 1 including a CCD or the like, a video signal pre-processing circuit 2 including an amplifying circuit for amplifying a video signal from the camera circuit 1 and a noise removing circuit for removing noise from the video signal, a signal change-over switch 3, and a picture image memory 4 for storing the video signal from the video signal pre-processing circuit 2. The signal change-over switch 3 selects either one of the video signal from the video signal pre-processing circuit 2 or the video signal read from the picture image memory 4. The video signal selected by the signal change-over switch 3 is supplied through a multiplex circuit 5 to a video signal post-processing circuit 6, and then amplified. The amplified video signal from the post-processing circuit 6 is supplied through a coaxial cable 7 to a television monitor 8 on which the video signal is displayed. An operation circuit 9 includes a zoom switch for selecting electronic zooming and a zoom area specifying switch. A control circuit 10 includes a microcomputer, and a memory drive circuit 11 includes a gate array. Moreover, a switch 12 is provided for controlling the zoom area displaying signal from the memory drive circuit 11 which is to be supplied to the multiplex circuit 5. The switch 12 is controlled to be turned on and off by a switching signal from the memory drive circuit 11. The zoom area displaying signal supplied through the switch 12 to the multiplex circuit 5 is multiplexed with the video signal in the multiplex circuit 5.

The signal change-over switch 3 is normally located at the position to which the video signal pre-processing circuit 2 is connected, and the switch 12 is in the off-state. In the normal state, the video signal from the camera circuit 1 is supplied through the video signal pre-processing circuit 2, the signal change-over switch 3, the multiplex circuit 5 and the video signal post-processing circuit 6 to the television monitor 8 on which the video signal is displayed.

In this embodiment, there is provided an area specifying and zooming function for specifying an area of the picture image displayed on the television monitor 8 and magnifying the specified area of the picture image. FIG. 2 shows five zoom areas of the picture image displayed on the monitor television set 8, which include the center area ①, the upper left area ②, the upper right area ③, the lower left area ④ and lower right area ⑤. When the zoom area specifying switch provided in the operation circuit 9 is operated, the zoom areas are changed. FIG. 3A shows the zoom area ① selected by the specifying switch, and FIG. 3B shows the zoom area ② selected by the specifying switch. The selected zoom area ① or ② has a higher brightness level than that of the other areas, and is easily distinguishable from the other areas. It is indicated that shaded areas in FIGS. 3A and 3B have a low brightness. When an area of the picture image which is to be magnified is specified by the zoom area specifying switch and then the zoom switch of the operation circuit 9 is operated, the switch 12 is turned off by the switching signal from the memory drive circuit 11, and the signal change-over switch 3 is so controlled by the switching signal from the control circuit 10 that it is changed to the position to which the picture image memory 4 is connected. The picture image memory 4 is driven by the control signal from the memory drive circuit 11, so that the video signal of the area specified by the zoom area specifying switch and produced from the video signal pre-processing circuit 2 is written in the picture image memory 4, and the video signal is sequentially read from the picture image memory 4. The video signal of the specified area sequentially read from the picture image memory 4 is supplied through the signal change-over switch 3, the multiplex circuit 5, and the video signal post-processing circuit 6 to the television monitor 8, so that the magnified picture image of the specified area is displayed on the television monitor 8. As illustrated in FIG. 2, the center area ① is specified and zoomed.

In this embodiment, there is provided the advantage that when a predetermined area of the picture image displayed on the monitor television set 8 is specified, the brightness level of the specified area is increased to be clearly distinguished from the other areas of the picture image.

In the above embodiment, only the video signal of the area to be zoomed is written in the picture image memory 4, however it is possible to write the video signal of one frame and upon zooming to read the video signal of the specified area. Moreover, in the above embodiment the brightness level of the specified zoom area is increased. However, the brightness level of the specified zoom area may be decreased, or the outer periphery of the specified zoom area may be. Also, a stripe pattern may be displayed to move within the specified zoom area.

Thus, according to this invention, since the area which is to be zoomed is displayed in a manner so as to be distinguished from the other areas, the zoomed area can be clearly seen.

I claim:

1. A picture image zooming apparatus comprising:
    display means for displaying a video signal produced from a camera area;
    area designation means for designating a predetermined area of a picture image displayed on said display means;
    zoom area displaying means for causing display on said display means of the predetermined area of the picture image designated by said area designation means so that the designated area is distinguished in brightness from the other areas of the picture image;
    a picture image memory for storing the video signal produced from said camera means; and
    zoom means for sequentially reading the video signal which is produced form said camera means and stored in said picture image memory, magnifying the portion of the read video signal which corresponds to said predetermined area designated by said area designation means and displaying the magnified video signal on said display means.

2. The apparatus as in claim 1, wherein said picture image memory stores only the portion of the video signal which corresponds to said predetermined area designated by said area designation means.

3. A picture image zooming apparatus comprising:
    camera means;
    display means for displaying a video signal produced from said camera means;
    zoom area selection means for selecting a given one of a plurality of pre-divided zoom areas of a picture image displayed on said means;
    zoom area display means for causing display on said display means of the one of the zoom areas selected by said zoom area selection means so that the selected zoom area is distinguished in enhanced brightness from the other zoom areas of the picture image;
    a picture image memory for storing the video signal produced from said camera means; and
    zoom area magnification display means for sequentially reading the video signal stored in said picture image memory, magnifying a portion of the stored video signal which corresponds to said one of the zoom areas selected by said zoom area selection means and displaying the magnified signal on said display means.

4. The apparatus as in claim 3, wherein said picture image memory stores only the portion of the video signal which corresponds to said one of the zoom areas selected by said zoom area selection means.

* * * * *